July 21, 1931.            J. L. BURNS            1,815,760
                       FLEXIBLE CLUTCH PLATE
                        Filed Jan. 24, 1929
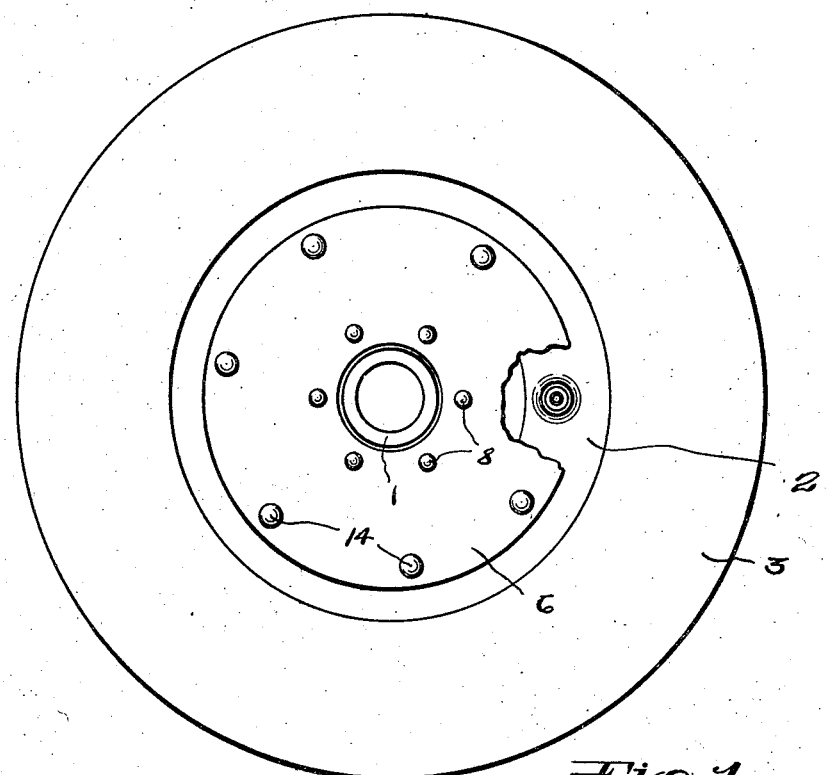
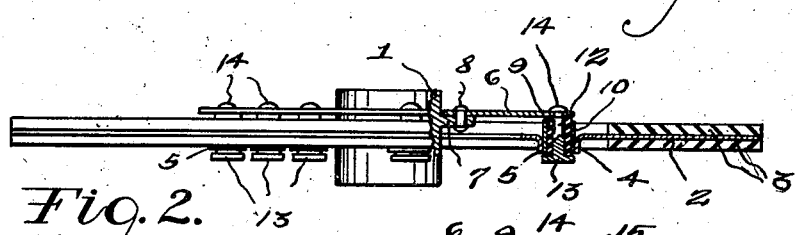
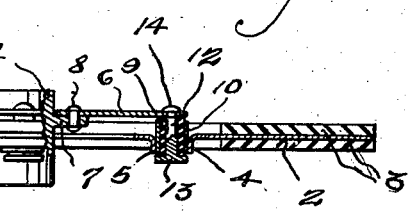
INVENTOR.
John L. Burns
BY Frederic H. Bodell
ATTORNEY.

Patented July 21, 1931

1,815,760

UNITED STATES PATENT OFFICE

JOHN L. BURNS, OF SYRACUSE, NEW YORK, ASSIGNOR, BY MESNE ASSIGNMENTS, TO FRANKLIN DEVELOPMENT CORPORATION, OF SYRACUSE, NEW YORK, A CORPORATION OF NEW YORK

FLEXIBLE CLUTCH PLATE

Application filed January 24, 1929. Serial No. 334,830.

This invention relates to friction clutches, and has for its object, a friction disk or plate, particularly the plate of single plate clutches by which the inner and outer portions of the single plate or disk are resiliently connected together in a particularly simple, economical and efficient manner to dampen torque, vibrations and noises incidental thereto, and also to render the clutch plate resilient so that it will engage with substantially equal pressure throughout its friction area.

The invention consists in the novel features and in the combinations and constructions hereinafter set forth and claimed.

In describing this invention, reference is had to the accompanying drawings in which like characters designate corresponding parts in all the views.

Figure 1 is an elevation of a clutch plate embodying my invention.

Figure 2 is a vertical sectional view thereof.

Figure 3 is an enlarged sectional detail view of one of the connections between the inner and outer plates.

This clutch plate comprises generally, a hub, an annular outer plate, an inner annular plate secured at its inner edge to the hub and having its outer margin lapping the inner margin of the outer plate, fastening members as rivets or studs connecting the lapping margins of the plates and bushings of yielding material as rubber surrounding the rivets, the bushings being of greater width than the outer plate, whereby each bushing thrusts at one end against the margin of the inner plate and at its other end against one of the heads of the rivet, that is, the head of the rivet remote from the inner plate.

1 designates the hub which, as will be understood, is slidably mounted on the clutch shaft and is shiftable by suitable throw-out mechanism axially of the shaft to disengage the clutch against the influence of a clutch spring acting to engage the clutch.

2 is the outer annular plate of resilient sheet metal, this being provided with friction faces or disks 3, this plate having a series of openings 4 around its inner edge and also having hubs 5 struck therefrom around the openings, these hubs being preferably located entirely on one side of the plate 2 and on the side remote from the inner plate 6. The inner plate 6 is secured in any suitable manner to the hub 1, it being here shown as having its inner margin lapping an annular flange 7 on the hub and secured thereto as by rivets 8.

9 are bushings of rubber in the holes 4 and hubs 5, these bushings being preferably located in metallic bushings 10 fitting the hubs 5 and projecting at 11 beyond the face of the plate 2 opposite to that from which the hubs 5 project, that is, the bushing 11 projects beyond the plate 2 toward the lapping outer margin of the inner plate 6 so that the inner plate is spaced apart from the outer plate. The rubber bushings 9 also project slightly beyond the ends of the bushings 10 and the hubs 5.

12 are the rivets or fastening members extending axially through the rubber bushings 9 and each having a head 13 at one end thrusting against the end of the rubber bushing 9 remote from the inner plate 6 and also having a head 14 overlying the outer face of the inner plate 6. The rivet 12 also has a shoulder at 15 opposed to the head 14, which shoulder thrusts against the inner face of the inner plate 6 so that the inner plate 6 is firmly secured or rigid with the rivets 12 and hence, the rivets are practically studs projecting from the plate 6.

In operation, the torque is transferred from one plate to the other as from the outer plate 2 to the inner plate 6 through the resilient bushings so that the bushings absorb torque and noise vibrations and also owing to the relative arrangement of the bushings, rivets and plates, the clutch plate is flexible and readily conforms throughout its area to the surface against which it is pressed by the clutch spring. This function is also facilitated by the resiliency of the plates 2 and 6.

What I claim is:

1. A friction plate for clutches comprising a hub, an outer annular friction plate formed with a series of openings around its inner edge, an inner annular flexible plate secured at its inner edge to the hub and having its outer margin lapping the inner margin of the outer plate, bushings of yielding material mounted in the openings of the outer plate and means for securing the plates together comprising fastening members extending through the outer margin of the inner plate and axially through the bushings, whereby the torque is transmitted from one plate to the other through the yielding bushings.

2. A friction plate for clutches comprising a hub, an outer annular friction plate formed with a series of openings around its inner edge and projecting hubs around the openings, an inner annular flexible plate secured at its inner margin to the hub and having its outer margin lapping the inner margin of the outer plate, resilient bushings arranged in the holes and the hubs of the outer plate and means for securing the plates together comprising members extending axially through the bushings and through the outer margin of the inner plate and having heads at their ends engaging the outer face of the inner plate and the ends of the bushings remote from the inner plate.

3. A friction plate for clutches comprising a hub, an outer annular plate formed with a series of openings around its inner edge and with hubs around said openings on one side of the plate, an inner annular plate secured at its inner margin to the hub and having its outer margin lapping the inner margin of the outer plate, metal bushings in said openings and hubs and extending beyond the plane of the side of the plate opposite to that on which the hubs are located, bushings of yielding material within the former bushings and means for securing the plates together including members extending axially through the yielding bushings and the outer margin of the inner plate and having heads at their ends thrusting against the inner plate and the ends of the yielding bushings remote from the inner plate.

4. A friction plate for clutches comprising a hub, an outer annular plate formed with a series of openings around its inner edge and with hubs around said openings on one side of the plate, an inner anular plate secured at its inner margin to the hub and having its outer margin lapping the inner margin of the outer plate, metal bushings in said openings and hubs, and extending beyond the plane of the side of the plate opposite to that on which the hubs are located, bushings of yielding material within the former bushings and means for securing the plates together including members extending axially through the yielding bushings and the outer margin of the inner plate and having heads at their ends thrusting against the inner plate and the ends of the yielding bushings remote from the inner plate, the yielding bushings projecting at their opposite ends beyond the ends of the metal bushings and the hubs, whereby the heads and the outer ends of the fastening members thrust against the yielding bushings and the margin of the inner plate thrusts against the inner ends of the yielding bushings.

5. A friction plate for clutches comprising a hub, an outer annular plate having friction surfaces and an inner annular plate of resilient sheet metal secured at its inner margin to the hub and having its outer margin lapping the inner margin of the outer plate, fastening members extending transversely through the lapping portions of the plates and resilient bushings surrounding the fastening members and passing through holes in the outer plate.

6. A friction plate for clutches comprising a hub, an outer annular plate having friction surfaces and an inner annular plate of resilient sheet metal secured at its inner margin to the hub and having its outer margin lapping the inner margin of the outer plate, fastening members extending transversely through the lapping portions of the plates and resilient bushings surrounding the fastening members, the resilient bushings thrusting at like ends against the margin of the inner plate, thereby spacing the outer margin of the inner plate from the inner margin of the outer plate.

7. A friction plate for clutches comprising a hub, an annular outer plate having friction surfaces and an inner annular plate of resilient sheet metal secured at its inner margin to the hub and having its outer margin lapping the inner margin of the outer plate and spaced therefrom, fastening members securing the lapping portions of the plates together and resilient bushings surrounding the fastening members, the resilient bushings thrusting at like ends against the margin of the inner plate thereby spacing the outer margin of the inner plate from the inner margin of the outer plate and the fastening members having heads at their ends remote from the inner plate, which heads thrust against the opposing ends of the resilient bushings.

8. A friction plate for clutches comprising a hub, an outer annular friction plate formed with openings around its inner edge, an inner annular plate secured at its inner margin to the hub and having its outer margin lapping and spaced from the inner margin of the outer plate and having studs projecting therefrom through the openings in the outer plate and yielding bushings around the studs, the studs having heads at their outer ends thrusting against the ends of the bushings.

In testimony whereof, I have hereunto signed my name, at Syracuse, in the county of Onondaga and State of New York, this 22nd day of January, 1929.

JOHN L. BURNS.